United States Patent
Zha et al.

(10) Patent No.: US 12,275,860 B2
(45) Date of Patent: Apr. 15, 2025

(54) DIGITALLY PRINTED LABELS

(71) Applicant: SUN CHEMICAL CORPORATION, Parsippany, NJ (US)

(72) Inventors: Yongping Zha, Carlstadt, NJ (US); Philippe Schottland, Carlstadt, NJ (US); Robert Mateuszczyk, Carlstadt, NJ (US); Jing Jiang, Carlstadt, NJ (US); Joanne Guite, Rochdale (GB); Nissra Kousar, Rochdale (GB)

(73) Assignee: Sun Chemical Corporation, Parsippany, NJ (US)

( * ) Notice: Subject to any disclaimer, the term of this patent is extended or adjusted under 35 U.S.C. 154(b) by 655 days.

(21) Appl. No.: 17/437,567

(22) PCT Filed: Mar. 13, 2020

(86) PCT No.: PCT/US2020/022636
§ 371 (c)(1),
(2) Date: Sep. 9, 2021

(87) PCT Pub. No.: WO2020/190723
PCT Pub. Date: Sep. 24, 2020

(65) Prior Publication Data
US 2022/0145090 A1 May 12, 2022

Related U.S. Application Data

(60) Provisional application No. 62/818,809, filed on Mar. 15, 2019.

(51) Int. Cl.
*C09D 5/00* (2006.01)
*B05D 5/04* (2006.01)
*C09D 175/04* (2006.01)
*G03G 7/00* (2006.01)
*G03G 9/12* (2006.01)

(52) U.S. Cl.
CPC .............. *C09D 5/002* (2013.01); *B05D 5/04* (2013.01); *C09D 175/04* (2013.01); *G03G 7/004* (2013.01); *G03G 7/0053* (2013.01); *G03G 7/008* (2013.01); *G03G 9/12* (2013.01)

(58) Field of Classification Search
None
See application file for complete search history.

(56) References Cited

U.S. PATENT DOCUMENTS

| | | | |
|---|---|---|---|
| 5,407,771 A | 4/1995 | Landa et al. | |
| 6,881,458 B2 | 4/2005 | Bret et al. | |
| 7,470,736 B2 | 12/2008 | Cooper | |
| 7,985,483 B2 | 7/2011 | Klenk | |
| 8,198,353 B2 | 6/2012 | Cooper | |
| 9,175,172 B2 | 11/2015 | Regnier | |
| 9,976,057 B2 | 5/2018 | Schottland et al. | |
| 2005/0034634 A1 | 2/2005 | Decker | |
| 2005/0245651 A1* | 11/2005 | Cooper | G03G 7/002 524/270 |
| 2017/0174927 A1 | 6/2017 | Collins et al. | |
| 2017/0329244 A1* | 11/2017 | Tzomik | G01N 21/64 |
| 2017/0369750 A1 | 12/2017 | Zhao et al. | |

FOREIGN PATENT DOCUMENTS

| | | |
|---|---|---|
| EP | 1 591 502 A1 | 11/2005 |
| EP | 3 067 399 A1 | 9/2016 |
| JP | 2007171239 A * | 7/2007 |
| JP | 2016-530564 A | 9/2016 |
| WO | WO 2012/093104 A1 | 7/2012 |
| WO | WO 2016/016286 A1 | 2/2016 |

OTHER PUBLICATIONS

International Search Report issued in International Application No. PCT/US2020/022636, mailed Jul. 6, 2020.
Written Opinion of the International Searching Authority issued in International Application No. PCT/US2020/022636, mailed Jul. 6, 2020.
International Preliminary Report on Patentability (Chapter II of the Patent Cooperation Treaty) issued in International Application No. PCT/US2020/022636, mailed May 25, 2021.
Taganksy, HP-Indigo Technology and its Application to Photo Printing, International Symposium for Digital Photo Fulfillment, pp. 31-34, (2012).
Japanese Office Action issued in counterpart JP Application No. 2021-555370, mailed Sep. 28, 2023 with English language translation thereof.
Office Action issued in Japanese application No. 2021-555370 mailed Oct. 2, 2024, with English language translation thereof.

* cited by examiner

*Primary Examiner* — Michael P. Rodriguez
(74) *Attorney, Agent, or Firm* — Marian E. Fundytus; Ostrolenk Faber LLP

(57) ABSTRACT

Described are primer coatings, overprint varnishes, and seaming solution solutions for application to substrates such as those used to make wrap around and sleeve labels, particularly shrink wrap labels, which are used to label containers. The labels can be digitally printed with or without lane priming. With certain seaming solutions, the labels can be removed in the wash stage to enable the recycling of containers.

8 Claims, No Drawings

DIGITALLY PRINTED LABELS

CROSS REFERENCE TO RELATED APPLICATIONS

The present application is a § 371 National Phase application based on PCT/US2020/022636 filed Mar. 13, 2020, which claims the benefit of U.S. Provisional Application No. 62/818,809, filed Mar. 15, 2019, the subject matter of each of which is incorporated by reference in their entirety.

Digital printing is a printing process in which the printed image is created directly from digital data, avoiding the use of "analogue" intermediate media. Among other applications, digital printing is used to digitally create pages and print elements. These items contain, for example, one or more of digitally created text, layouts, and images. Unlike conventional printing processes, digital printing does not require intermediate prepress processes between the digital document file and the final print. For example, among that which is not required are film, image setters, plates, plate setters, photo-chemicals, and other analogue elements. There is also no need for press make-ready: no plate mounting, no registration adjustments, no ink keys, and no waste.

Printing with on-demand digital printing machines utilizing liquid electrophotographic systems is now widespread. In such systems, liquid toner images are formed on a photosensitive drum and then transferred electronically onto an intermediate transfer blanket or belt for printing onto paper, polymeric film sheet, or web.

Liquid toner may be used in electrostatic digital printers. One such liquid toner is described in U.S. Pat. No. 5,407,771. Printers using such liquid toner are commercially available from Hewlett-Packard Company under the trade name HP Indigo. Liquid toners usually do not transfer well or do not adhere well to paper or polymeric films unless they have been treated with a coating or primer (also referred to as "optimized") to enhance the adhesion of liquid toners.

Coatings and primers have been developed that render the surfaces of paper or polymeric films more compatible with liquid toner inks. For example, they improve the printing and adherence of liquid toner ink to the coating- or primer-applied substrate. However, issues may arise when such coatings or primers are applied to digitally printed shrink films in which film edges are overlapped to form a seam that is welded closed with a seaming solution, a/k/a seam welding solvent. Such films are formed into sleeves and shrunk to fit on the outside an article, such as a plastic container that will be filled with foods, beverages, household cleaners, automotive fluids, etc. The films are printed with text, images, logos, etc. to provide a label for the packaged material in the container. With such shrink wrap films, the bond in the seam that is formed by the seam welding solvent must be strong enough to hold the sleeve of the shrink wrap film around the container after shrinking, and the bond must be maintained for the entire useful life of the article (e.g., from packaging of the article through travel to the point of commercial transaction and then at least through to the time when the contents of the article are consumed or discarded), Some seaming solvents cannot penetrate the primer layer, thus compromising seaming and sleeve forming. For that reason, the seaming area must remain free of primer (and any other coating, such as print and varnish). This concern can be addressed through selective priming, or "lane priming", in which a 4 to 7 mm wide area extending inward from a label edge is left unprimed in order to allow for a good seam to be formed. However with lane priming, primer is not present in the seam area; thus it difficult and perhaps impossible to print with liquid toner ink in this area, since this area is primer free.

Lane priming is usually performed using analogue printing processes (e.g., flexography). To deviate from a full and complete digital printing process in order to incorporate analog printing steps adds additional time to the printing process. Eliminating time consuming lane priming could make more of the printing process steps digital, which can shorten turnaround time, increase productivity, and provide more design flexibility.

The number of plastic containers that are recycled has been increasing for some time now. While plastic containers are recyclable, the shrink label materials used for the labels on the containers are often not recyclable. Therefore, it is necessary to remove the shrink wrap label from the plastic container, or separate the label material from the container material, to allow recycling of the plastic container. When the labels are not easily separable from the containers, many containers are not recycled that otherwise would be, thereby reducing recycling yield. Thus, there is a need to produce easily separable labels to increase the efficiency of recycling.

The Association of Plastics Recyclers, guidelines from brand owners, and publications of the National Association for PET Container Resources (NAPCOR), are all pointing to the issue created by full body sleeve labels in the recycling system. The sleeves tend to obscure the automated detection systems during the sorting process. As a result, PET recycling facilities have seen decreasing yields as sleeved bottles tend to end up being separated from clear PET containers and discarded. Thus, it would be advantageous if sleeve labels can be removed relatively quickly, for example, within 15 minutes of being exposed to a hot aqueous solution containing a caustic material such as NaOH (e.g., 1.0 wt % NaOH solution at 75° C.), and more preferably within 10 minutes under these conditions.

To alleviate the problems with sorting, recyclers and brand owners may recommend using paper labels or partial sleeves made with low density thermoplastic materials, such as polyolefins. However, such materials do not have the desirable shrink properties or printability of higher density substrates such as PET-G.

Shrink sleeve separation from plastic containers such as PET containers is typically achieved in sink/floatation tanks as part of the overall recycling process, in which bales of containers of for example PET are converted clear recycled PET (R-PET) flakes to be re-used for container making.

Several film/resin suppliers, including Exxon, Toppas, and Cryovac, or converters such as Fujiseal, have introduced low density films or co-extruded film structures with low density (below 1.0 or at least below 1.05), to address the shrink sleeve separation issue. Such films are generally based on mono- or multi-layer structures including polymers built around a low-density core, such as polyolefins, or micro-voided/cavitated polymer, optionally wrapped by a PET-G skin, and, if needed, a tie layer between the core and the PET-G. The overall density of the film is designed to make it floatable in the sink/floatation tank. However, if the density prior to printing is not low enough, it is possible for the printed sleeve to become too dense, and therefore unable to be separated from the PET container to be recycled. Furthermore, the label made from low density films cannot cover more than 80% of the container, otherwise the automated detection system will be obscured during the sorting process. Ideally, shrink sleeve should cover up to 100% of the container, thus maximizing artwork and text and providing 360 degrees design flexibility.

Accordingly, there is still a need in the art for a primer or coating to be used in combination with a seaming solution which provides good adhesion to the primer and/or coating without the need for lane priming. With certain seaming solutions, the seamed shrink sleeves will come apart in the wash stage and enable the recycling of containers.

Further, there is a need for seaming solutions that provide sufficient bond strength in the seam of a shrink wrap label, which is compatible with the primer composition applied to the substrate.

Digital printing presses comprising one or more print stations, where for example, inks, primers and other compositions are digitally printed on a substrate, have improved printing operations. For example, a printed material can be prepared in-line, that is by transfer from print station to print station on a single digital printing press, such as for example the printing presses commercial known as HP Indigo presses. The print stations may be different color stations, or may be used to print different print composition, such as a primer composition and ink compositions. The HP Indigo presses use liquid electrophotography to print with a liquid ink known as HP Electroink®, which contains electrically charged particles dispersed in liquid. After electrically charging a photoconductor, a laser image is created by a multi-laser scanning unit. The ink is developed on the latent image by one of several colored ink development stations. After ink is transferred to the blanket using electric fields, the carrier liquid is evaporated off of the hot blanket and the remaining hot melted ink film is transferred to the substrate by pressure and tack. This process is repeated at each color station. See, e.g., Taganksy, *HP-Indigo Technology and its Application to Photo Printing*, International Symposium for Digital Photo Fulfillment, pp. 31-34, (2012).

The disclosed invention not only provides better bonds strength on digitally printed shrink labels with lane priming, but also makes it possible for the first time to seam on flood coated and printed digital labels.

References that may be of interest include U.S. Pat. Nos. 5,407,771; 6,881,458; 7,470,736; 7,985,483; 8,198,353; 9,175,172; and 9,976,057; and U.S. Publ. Patent Appln. No. 2017/0174927.

SUMMARY OF THE INVENTION

Described herein are primer compositions for application to substrates used in labeling articles of commerce such as containers for various goods. The primers facilitate and enable the printability of substrates that have demonstrated difficulties when used in digital printing operations, such as printing such substrates with liquid toners used in digital printing operations. Further, the primer compositions do not interfere with the ability of a seaming solution to form a sufficiently strong bond in order to attach the label to the substrate. This includes the forming a sufficiently strong bond in the seam area of a shrink wrap label formed of a shrinkable substrate into a cylindrical loop, e.g., a heat shrinkable substrate, such as one made of PET or PET-G, which substrate has been shrunk to fit the size and dimensions of the article. In other words, the entire substrate may be coated with primer in a digital printing process, and the primer composition will not interfere with the ability of the seaming solvent to form a sufficiently strong bond.

Also described herein are overprint varnishes and seaming solutions that can be used alone, in combination with one another, and with the primer composition.

Also described herein are primed substrates.

Described herein is a method of preparing a substrate for the labeling of articles including the steps of: applying a primer composition to the substrate, without lane priming;

wherein the primer composition comprises 60 wt % to 95 wt % aqueous polyurethane dispersion and 5.0 wt % to 40 wt % aqueous dispersion of a copolymer of one or more α-olefins and one or more acid-based monomers, preferably 65 wt % to 85 wt % aqueous polyurethane dispersion and 15 wt % to 35 wt % aqueous dispersion of a copolymer of one or more α-olefins and one or more acid-based monomers.

In one aspect, the primer composition is applied by a process selected from digital printing, inkjet, offset, flexographic, lithographic, gravure, screen printing, roll coating, spray coating, and die coating.

In one aspect, a liquid toner ink composition is applied over the primer composition.

In one aspect, the liquid toner ink composition is applied by digital printing.

In one aspect, the primer composition is applied by digital printing.

In one aspect, the primer composition facilitates adhesion of the liquid toner ink composition to a polymeric substrate.

In one aspect, the substrate is a heat shrinkable polymeric substrate.

In one aspect, the heat shrinkable polymeric substrate is suitable for use in forming shrink sleeve labels for articles.

In one aspect, the substrate is selected from paper, art paper, coated paper, paperboard, polymeric films, and non-wovens.

In one aspect, the substrate is a polymeric film selected from polyethylene terephthalate, polyethylene terephthalate glycol, polybutylene terephthalate, polycarbonate, polyolefin, cyclic polyolefins, alpha-polyolefins, polyethylene, polypropylene, oriented polypropylene, polystyrene, oriented polystyrene (OPS), polyvinyl chloride, and nylon.

In one aspect, the primer composition is applied on at least one edge of the polymeric substrate in a location that is within 7 mm of the at least one edge; preferably within 6 mm of the at least one edge; more preferably within 5 mm of the at least one edge; and even more preferably within 4 mm of the at least one edge.

In one aspect, the primer composition is applied on at least two edges of the polymeric substrate in locations that are within 7 mm of the at least two edges; preferably within 6 mm of the at least two edges; more preferably within 5 mm of the at least two edges; and even more preferably within 4 mm of the at least two edges.

In one aspect, the primer composition is applied to the edge of the polymeric substrate in the seaming area, without leaving an unprimed area on the edge of the polymeric substrate in the seaming area.

In one aspect, the seaming solution contacts and overlaps the primer composition.

In one aspect, an overprint varnish is applied over the liquid toner ink composition, the overprint varnish comprising 10 wt % to 90 wt % (meth)acrylic copolymer and 10 wt % to 90 wt % gum rosin, preferably 25 wt % to 75 wt % (meth)acrylic copolymer and 25 wt % to 75 wt % gum rosin.

In one aspect, at least one of the applying of the primer composition, the applying of the liquid toner ink composition, the applying of the overprint varnish, and the applying of the seaming solution occur in line on a digital printing machine.

In one aspect, at least two of the applying of the primer composition, the applying of the liquid toner ink composition, the applying of the overprint varnish, and the applying of the seaming solution occur in line on a digital printing machine.

In one aspect, the applied seaming solution contacts and overlaps the applied primer composition.

Described herein is a method of preparing a shrink wrap label for the labeling of articles comprising the steps of:
applying a primer composition to a heat shrinkable polymeric substrate, without lane priming, the primer composition comprising 60 wt % to 95 wt % aqueous polyurethane dispersion and 5.0 wt % to 40 wt % aqueous dispersion of a copolymer of one or more α-olefins and one or more acid-based monomers, preferably 65 wt % to 85 wt % aqueous polyurethane dispersion and 15 wt % to 35 wt % aqueous dispersion of a copolymer of one or more α-olefins and one or more acid-based monomers;
applying a liquid toner ink composition to the substrate;
applying a seaming solution on at least one edge of the substrate;
positioning the substrate around an article having a shape;
forming a seam comprised of contacting edges of the substrate, one of which contacting edges is the at least one edge to which seaming solution is applied, whereby a bond is formed in the seam; and
shrinking the substrate in conformance with the shape of the article.

In one aspect, the contacting edges of the substrate that form the seam overlap with each other.

The various aspects described above apply to this method as well.

In one aspect, the seaming solution is comprised of 0 wt % to 50 wt % of a polyester resin or a polyester resin blend and 50 wt % to 100 wt % of one or more solvents, wherein, if a polyester resin or polyester resin blend is present, the glass transition temperature (Tg) of the polyester resin or polyester resin blend is preferably about −10° C. to about 50° C., and one of the solvents is a seam-welding solvent. In one aspect, the viscosity of the seaming solution is 1 cP to 50 cP as determined on a Brookfield DV-2T viscometer with spindle SC4-18 (18) at 30 rpm, at 25° C. or approximately thereto. The Tg of a polyester blend is the Tg value of the combined polyester resins. A polyester resin blend is a mixture of two or more polyester resins.

In one aspect, the amount of polyester resin or polyester resin blend present in the seaming solution is 1.0 wt % to 50 wt %.

In one aspect, a polyester resin blend is present in the seaming solution.

In one aspect, the seaming solution produces a bond in the seam having primer and the seaming solution having a T-peel strength of ≥20 gf.

In one aspect, the seaming solution produces a bond having a S-pull strength of ≥3,000 gf/inch.

In one aspect, the T-peel strength of ≥20 gf and/or the S-pull strength of ≥3,000 gf/inch are obtained whether or not the primer and/or the OPV described herein are applied.

Further described herein is a method of preparing a shrink wrap label for the labeling of articles comprising the steps of:
applying a liquid toner ink composition to a heat shrinkable polymeric substrate that has been coated with a primer composition without lane priming, the primer composition comprising 60 wt % to 95 wt % aqueous polyurethane dispersion and 5.0 wt % to 40 wt % aqueous dispersion of a copolymer of one or more α-olefins and one or more acid-based monomers, preferably 65 wt % to 85 wt % aqueous polyurethane dispersion and 15 wt % to 35 wt % aqueous dispersion of a copolymer of one or more α-olefins and one or more acid-based monomers.

The various aspects described above apply to this method as well.

Still further described herein is a primer composition comprising 60 wt % to 95 wt % aqueous polyurethane dispersion and 5.0 wt % to 40 wt % aqueous dispersion of a copolymer of one or more α-olefins and one or more acid-based monomers, preferably 65 wt % to 85 wt % aqueous polyurethane dispersion and 15 wt % to 35 wt % aqueous dispersion of a copolymer of one or more α-olefins and one or more acid-based monomers.

In one aspect, the polyurethane dispersion comprises a polyurethane that is the reaction product of: (A) a polyisocyanate component; (B) a polyol component; and (C) an isocyanate-reactive component comprising an ionic group or potentially ionic, i.e., with a neutral charge ($—NH^2$) that becomes an ionic ($—NH^{3+}$) group.

In one aspect, the polyisocyanate component of the polyurethane dispersion is selected from diisocyanates and diisocyanate reaction products comprising urethane groups, urea groups, uretodione groups, uretonimine groups, isocyanaurate groups, iminooxadiazine dione groups, oxadiazine trione groups, carbodiimide groups, acyl urea groups, biuret groups, allophanate groups, and combinations thereof.

In one aspect, the polyisocyanate component is selected from 4,4'-diisocyanatocyclohexylmethane; hexamethylene diisocyanate; 1-methyl-2,4(2,6)-diisocyanatocyclohexane; 1-isocyanato-3,3,5-trimethyl-5-isocyanatomethyl-cyclohexane; norbornane diisocyanate; 2,4-diisocyanatotoluene; 2,6-diisocyanatotoluene; 1-methyl-2,4-diisocyanatocyclohexane; 1-methyl-2,6-diisocyanatocyclohexane; 4,4'-diisocyanatodiphenylmethane; xylylene diisocyanate; tetramethylene diisocyanate; 1,4-diisocyantobutane; 1,12-diisocyanatododecane; 2,3,3-trimethylhexamethylene diisocyanate; 1,4-cyclohexylene diisocyanate; 4,4'-dicyclohexylmethane diisocyanate; 4,4'-dicyclohexyl diisocyanate; α,α,α',α'-tetramethyl-m- or p-xylylene diisocyanate; triphenylmethane 4,4',4"-triisocyanate; 4-isocyanatomethyl-1,8-octamethyl ene diisocyanate; and combinations thereof.

In one aspect, the polyol component is selected from an oligomeric or polymeric compound having terminal hydroxyl groups, pendant hydroxyl groups and a combination thereof.

In one aspect, the polyol component is selected from polyether polyol, polyester polyol, polyacrylic polyol, polycarbonate polyol.

In one aspect, the polyol component is selected from polyether polyol, polyester polyol, polyacrylic polyol, polycarbonate polyol comprising tetrahydrofuran, styrene oxide, propylene oxide, ethylene oxide, butylene oxide, epichlorohydrin, ethylene glycol, 1,2 propanediol, 1,3-propanediol, diethylene glycol, 1,4-butanediol; 1,5-pentanediol, 1,6-hexanediol, 1,8-octanediol, neopentyl glycol, 2-methyl-1,3-propanediol, bis-hydroxymethylcyclohexane, 2,2-bis-(4-hydroxyphenyl)propane, trimethylolpropane, glycerol, triethanolamine, pentaerythritol, tris-(2-hydroxyethyl)isocyanurate, and mixtures thereof.

In one aspect, the isocyanate-reactive group is selected from 2,2-bis(hydroxymethyl)-alkanecarboxylic acids, dimethylolacetic acid; 2,2-dimethylol-propionic acid; 2,2 dimethylolbutyric acid; 2,2-dimethylolpentanoic acid; dihydroxysuccinic acid, hydroxypivalic acid; and combinations thereof.

In one aspect, the polyurethane dispersion has a solids content of 5.0 wt % to 55 wt %, preferably 20 wt % to 40 wt %.

In one aspect, the α-olefin component of the copolymer of one or more α-olefins and one or more acid-based monomers is selected from ethylene; propylene; isobutylene; 1-butene; 1-pentene; 1-hexene; 4-methyl-1-pentene; 1-octene; and combinations thereof.

In one aspect, the acid based monomer component of the aqueous dispersion of a copolymer of one or more α-olefins and one or more acid-based monomers is selected from acrylic acid; methacrylic acid; maleic acid; maleic acid anhydride; itaconic acid; fumaric acid; crotonic acid; citraconic acid; citraconic anhydride; methyl hydrogen maleate; ethyl hydrogen maleate; ethyl acrylate; methyl methacrylate; ethyl methacrylate; methyl acrylate; isobutyl acrylate; methyl fumarate; vinyl acetate; vinyl propionate; vinyl benzoate; vinyl chloride; vinylidene chloride; acrylamide; acrylonitrile; methacrylonitrile; fumaronitrile; derivatives thereof and combinations thereof.

In one aspect, the aqueous dispersion of a copolymer of one or more α-olefins and one or more acid-based monomers is derived from ethylene; acrylic acid; methacrylic acid; and a combination of acrylic acid and methacrylic acid.

In one aspect, the aqueous dispersion of a copolymer of one or more α-olefins and one or more acid-based monomers has a solids content of 10 wt % to 60 wt %, preferably 30 wt % to 50 wt %.

The described primer compositions eliminate the need to lane prime the label substrates when preparing labels by digital printing operations.

It is also possible to achieve the recycling of containers with digitally printed shrink wrap labels through relative rapid removal of the labels from the containers.

Still further described herein is a primed substrate comprising a primer composition that comprises 60 wt % to 95 wt % aqueous polyurethane dispersion and 5.0 wt % to 40 wt % aqueous dispersion of a copolymer of one or more α-olefins and one or more acid-based monomers, preferably 65 wt % to 85 wt % aqueous polyurethane dispersion and 15 wt % to 35 wt % aqueous dispersion of a copolymer of one or more α-olefins and one or more acid-based monomers that is applied to a substrate.

The various aspects described above apply to the inventive primed substrate as well.

In one aspect, the primer composition facilitates adhesion of a liquid toner ink composition to a polymeric substrate.

Also described herein are seaming solutions for affixing label substrates to containers, including wrap-around and sleeve labels, such as shrink wrap labels. The labels can be digitally printed with or without lane priming. With certain seaming solutions, the labels can be removed in the wash stage to enable the recycling of containers.

The seaming solutions described herein comprise 1.0 wt % to 50 wt % of a polyester resin or a polyester resin blend and 50 wt % to 99 wt % of one or more solvents, wherein the Tg of the polyester or the polyester resin blend is about −10° C. to about 50° C., and one of the solvents is a seam welding solvent. In one aspect, the seaming solution has a viscosity of 1 cP to 50 cP as determined on a Brookfield DV-2T viscometer with spindle SC4-18 (18) at 30 rpm, at 25° C. or approximately thereto. The Tg of a polyester blend is the Tg value of the combined polyester resins.

In one aspect, the seam welding solvent is selected from tetrahydrofuran, 1,3-dioxolane, dioxane, n-hexane, cyclohexane, methylcyclohexane, methyl ethyl ketone, acetone, methyl isobutyl ketone, methyl acetate, methanol, isopropyl alcohol, and combinations thereof.

In one aspect, the seam welding solvent is selected from tetrahydrofuran, 1,3-dioxolane, methyl ethyl ketone, and combinations thereof.

In one aspect, the one of or both of the primer coating and seaming solution combination are at least partially hydrolysable or solutionable under the conditions of recycling.

In one aspect, the label sleeves for labeling plastic containers described herein (i.e., coated with the primers and/or seaming solutions described herein) can be removed from the container when placed in a hot caustic bath during the recycling process. For example, the sleeves may be removed by de-seaming the sleeve label, which opens the endless loop that the label has been formed into, which makes for easy removal of the label from the article. That is, the label separates from the article when the article is placed into a hot caustic bath, which opens the seam up, as the seaming solutions are solutionable and/or at least partially hydrolysable in a hot caustic bath.

The terms "hot caustic bath" and "hot caustic solution" are defined as a 1.0% by weight NaOH aqueous solution at a temperature of 75° C. The terms are used interchangeably herein.

The term "solutionable in a hot caustic bath" is defined as 0.5 grams of solid resin being 20% to 100% by weight soluble in 100 grams of hot caustic solution when immersed therein for 20 minutes, preferably 50% to 100% by weight soluble, and more preferably 80% to 100% by weight soluble.

The terms "solutionable", "solutioned", and "soluble" are used interchangeably herein.

The term "at least partially hydrolysable . . . in a hot caustic bath" is defined as having at least some of the hydrolysable functional groups hydrolyze in a hot caustic bath when immersed therein for 20 minutes. The hydrolysable functional groups include for example OH, —COOH, or —SO$_3$H which upon hydrolyzation, deprotonate and undergo cation exchange, in the presence of a base (e.g., alkaline solution or a caustic solution). For example, H+, in the presence of NaOH, is exchanged for Na+, the M+ metal cation.

In one aspect, described are articles wrapped with shrink sleeve labels to which one or more of the primer compositions, OPVs, and seaming solutions as described above are applied.

In one aspect, the label separates in less than 20 minutes at 85° C. when exposed to a hot caustic solution containing 1.0 wt % NaOH.

In one aspect, the label separates in less than 20 minutes at 65° C. when exposed to a hot caustic aqueous solution containing 1.0 wt % NaOH.

In one aspect, the label separates in less than 15 minutes at 75° C. when exposed to a hot caustic solution containing 1.0 wt % NaOH.

In one aspect, the label separates in less than 10 minutes at 75° C. when exposed to a hot caustic solution containing 1.0 wt % NaOH.

In one aspect, the label separates in less than 10 minutes at 85° C. when exposed to a hot caustic solution containing 1.0 wt % NaOH.

The seaming solutions of the present invention are preferably applied by a liquid dosing system such as needle or felt wick. Other deposition methods, such as roll, spray, die coating, or screen, flexographic, gravure printing may be possible by adjusting the coating composition to the rheology required for proper deposition for a particular technique.

In one embodiment, the label is a full wrap label.

In another embodiment, the label is a partial wrap label.

In certain embodiments, the label is a shrink wrap label.

In one embodiment, the article is a plastic article.

In one aspect, the present disclosure is directed to sleeve labels prepared from the coatings described herein.

Also described herein are overprint varnishes.

Still further described herein is an overprint varnish comprising 10 wt % to 90 wt % of one or more (meth)acrylic homopolymers or (meth)acrylic copolymers and 10 wt % to 90 wt % of one or more gum rosins, preferably 25 wt % to 75 wt % of one or more (meth)acrylic homopolymers or (meth)acrylic copolymers and 25 wt % to 75 wt % of one or more gum rosins.

In one aspect, the one or more (meth)acrylic homopolymers or (meth)acrylic copolymers are the polymerization product of one or more alkyl acrylate monomers; aryl acrylate monomers; alkaryl (meth)acrylate monomers; acrylic acid and the ester thereof; methacrylic acid and the ester thereof; with or without alcohols that include at least one heteroatom in addition to the oxygen atom in the alcohol group; alcohols containing an aliphatic ring or an aromatic ring; and combinations thereof.

In one aspect, the one or more (meth)acrylic homopolymers or (meth)acrylic copolymers are the polymerization product of one or more monomers selected from methyl methacrylate; methyl acrylate; n-butyl acrylate; ethyl acrylate; 2-ethylhexyl acrylate; 2-ethoxyethyl acrylate; 2-butoxyethyl (meth)acrylate; dimethylaminoethyl (meth)acrylate; diethylaminoethyl (meth)acrylate; cyclohexyl (meth)acrylate; phenylethyl (meth)acrylate; phenylpropyl (meth)acrylate; acrylates of heterocyclic alcohols; furfuryl (meth)acrylate; and combinations thereof.

In one aspect, the one or more (meth)acrylic homopolymers or (meth)acrylic copolymers includes a (meth)acrylic copolymer selected from (meth)acrylic copolymer; ethylene (meth)acrylic copolymer; styrene (meth)acrylic copolymer derived from (meth)acrylic acid; itaconic acid; methyl (meth)acrylate; ethyl (meth)acrylate; n-butyl (meth)acrylate; isobutyl (meth)acrylate; tert-butyl (meth)acrylate; 2-ethylhexyl (meth)acrylate; (meth)acrylamide; (meth)acrylonitrile; hydroxyethyl (meth)acrylate; and combinations thereof.

In one aspect, the one or more (meth)acrylic homopolymers or (meth)acrylic copolymers are present in a dispersion having a solids content of 30 wt % to about 70 wt %, preferably about 35 to about 65 wt %, and more preferably about 40 to about 60 wt %.

In one aspect, the one or more gum rosins are derived from acids selected from abietic acid; neoabietic acid; palustric acid; levopimaric acid; dihydroabietic acid; pimaric acid; isopimaric acid; and sandaracopimaric acid; with or without esterification with pentaerythritol; with or without being reacted with maleic anhydride or fumaric acid; and combinations thereof.

In one aspect, the one or more gum rosins are derived from maleic acid, maleic anhydride, fumaric acid, and fumaric anhydride, and polyesters resins derived from gum rosin feedstocks.

It has been found that by employing the primer compositions described herein (such as the one of Example 1) and seaming solutions described herein, label substrates, such as shrink sleeve label substrates, can cover 80% or more, e.g., 81% or more, and up to and including 100%, of the article which the substrates are labeling. This is in contrast to low density substrate films, which cannot cover more than 80% of the article.

DETAILED DESCRIPTION OF THE INVENTION

As used herein, the term "coating" includes but is not necessarily limited to liquid compositions that can be deposited on a substrate in various ways, including, but not limited to, printing (such as, including but not limited to, analog or digital, inkjet, offset, flexographic, lithographic, gravure, screen printing), roll coating, spray coating, die coating, and the like; the term "seaming solution" or "seaming solvent" includes but is not necessarily limited to liquid compositions that are typically applied by a liquid dosing system such as needle or felt wick on the edge of shrink films to make shrink sleeve labels. Also provided are methods and processes for application and use of the coatings of the invention, as well as the articles produced.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

Suitable substrates include, but are not limited to, paper (including art paper, coated paper, and paperboard), plastics, films, nonwovens, and the like. Substrates made of plastics include polyethylene terephthalate (PET), polyethylene terephthalate glycol (PET-G), polybutylene terephthalate (PBT), polycarbonate, polyolefins, cyclic polyolefins (COC) and alpha-polyolefins such as polyethylene (PE), polypropylene (PP), oriented polypropylene (OPP), polystyrene, oriented polystyrene (OPS), polyvinyl chloride (PVC), nylon, or the like. As used herein, "nonwoven" refers to a substrate made from a fiber material such as wood cellulose, cotton, rayon, PET, PBT, polyacrylonitrile, PP, or the like. In specific embodiments, the substrate is a PET-G shrink film.

The coatings and seaming solutions of the invention enable good seaming, and resistance to cold water. Further, as the seamed label is adhered to the container by shrinking it, the seam formed out of the seaming solutions remain intact and retains sufficient bond strength, despite the shrinking of the label (in this sense, the seaming solutions are resistant to shrinking). The container can be constructed of plastics, glass, metal, or other materials.

In one aspect, the coatings of the invention promote good bonding at the seam when seamed by the seaming solutions of the invention, with subsequent ease of removal for recycling of the containers. The coatings and seaming solutions of the invention are useful for coating labels, including wrap around and sleeve labels, particularly shrink wrap labels, to be applied to plastic containers, while allowing efficient de-seaming and removal of the label during the recycling process.

Polyurethane Polymers

The polyurethane polymer may comprise a reaction product of: (A) a polyisocyanate component; (B) a polyol component; and (C) an isocyanate-reactive component comprising an ionic group or potentially ionic group. As used herein, the term "polyisocyanate" refers to compounds comprising at least two unreacted isocyanate groups. Polyisocyanates include diisocyanates and diisocyanate reaction products comprising, for example, urethane groups, urea groups, uretodione groups, uretonimine groups, isocyanaurate groups, iminooxadiazine dione groups, oxadiazine trione groups, carbodiimide groups, acyl urea groups, biuret groups, and/or allophanate groups.

The polyisocyanate repeat unit in the polyurethane polymer may comprise an aliphatic or cycloaliphatic diisocyanate. Examples of the polyisocyanate component (A) include, but are not limited to, 4,4'-diisocyanatocyclohexylmethane (HMDI); hexamethylene diisocyanate (HDI); 1-methyl-2,4(2,6)-diisocyanatocyclohexane; or 1-isocyanato-3,3,5-trimethyl-5-isocyanatomethyl-cyclohexane (IPDI); and mixtures thereof. Preferably the polyisocyanate component is 4,4'-diisocyanatocyclohexylmethane (HMDI). In addition to the aliphatic or cycloaliphatic diisocyanate, the water-dilutable carboxyl or hydroxyl functional polyurethane dispersion may also contain other polyisocyanates, such as norbornane diisocyanate (NBDI); 2,4- and/or 2,6-diisocyanatotoluene (TDI); 1-methyl-2,4- and/or -2,6-diisocyanatocyclohexane; and 4,4'-diisocyanatodiphenylmethane (MDI); xylylene diisocyanate; tetramethylene diisocyanate; 1,4-diisocyantobutane; 1,12-diisocyanatododecane; 2,3,3-trimethylhexamethylene diisocyanate; 1,4-cyclohexylene diisocyanate; 4,4'-dicyclohexylmethane diisocyanate; 4,4'-dicyclohexyl diisocyanate; α,α,α',α'-tetramethyl-m- or p-xylylene diisocyanate; triphenylmethane 4,4',4"-triisocyanate; 4-isocyanatomethyl-1,8-octamethylene diisocyanate; and mixtures thereof.

In various non-limiting embodiments, the polyol component (B) may comprise an oligomeric or polymeric compound having terminal and/or pendant hydroxyl groups. Examples of the polyol component include, but are not limited to, polyether polyol polyester polyol, polyacrylic polyol, polycarbonate polyol, or mixtures thereof, which may comprise diol, triol or tetraol monomers. Examples of diol monomers include tetrahydrofuran; styrene oxide; propylene oxide; ethylene oxide; butylene oxides; epichlorohydrin; ethylene glycol; 1,2 propanediol; 1,3-propanediol; diethylene glycol; 1,4-butanediol; 1,5-pentanediol; 1,6-hexanediol; 1,8-octanediol; neopentyl glycol; 2-methyl-1,3-propanediol; the bis-hydroxymethylcyclohexane isomers; and 2,2-bis-(4-hydroxyphenyl)propane. Examples of triol monomers include trimethylolpropane (TMP), glycerol, and triethanolamine. In one aspect, pentaerythritol or tris-(2-hydroxyethyl) isocyanurate (THEIC) is used as a tetraol monomer.

In various non-limiting embodiments, the isocyanate-reactive group (C) may comprise at least one ionic group or potentially ionic group, which may be either cationic or anionic in nature. The isocyanate-reactive component (C) may also comprise at least one isocynanate-reactive group such as a hydroxyl group and/or an amine group. Examples of the isocyanate-reactive group (C) include, but are not limited to, 2,2-bis(hydroxymethyl)-alkanecarboxylic acids (such as dimethylolacetic acid; 2,2-dimethylol-propionic acid; 2,2 dimethylolbutyric acid; or 2,2-dimethylolpentanoic acid), dihydroxysuccinic acid, hydroxypivalic acid and mixtures thereof.

A base can be used to neutralize of partially neutralizing the carboxyl groups of the polyurethane polymer. Bases include, but are not limited to, ammonia, N-methylmorpholine, dimethyl-isopropanol amine, triethylamine, dimethylethanolamine, methyldiethanol-amine, triethanolamine, morpholine, tripropylamine, ethanolamine, triisopropanolamine, 2-diethylamino-2-methyl-1-propanol and mixtures of these and/or other neutralizing agents. Sodium hydroxide, lithium hydroxide and potassium hydroxide are also suitable, although less preferred, as neutralizing agents.

The solids content of the polyurethane dispersion is about 5-55%, preferably about 20-40% by weight.

The viscosity of the polyurethane dispersion is about 5 cP to 5000 cP, preferably about 100 cP to 2000 cP.

Suitable commercially available polymer dispersions include U4000VP available from Alberdingk, WLS-201 from DIC, and Neorez R-600 from DSM.

Copolymers of One or More α-Olefins and One or More Acid-Based Monomers

As used herein, "copolymer" refers to a polymer made up of two or more monomers. In various embodiments, the copolymer may include one or more α-olefins and one or more acid-based monomers. The α-olefin may be, by way of example and not limitation, ethylene, propylene, isobutylene, 1-butene, 1-pentene, 1-hexene, 4-methyl-1-pentene, 1-octene, or combinations thereof.

The acid-based monomer may be, by way of example and not limitation, acrylic acid, methacrylic acid, maleic acid, maleic anhydride, itaconic acid, fumaric acid, crotonic acid and citraconic acid and anhydride, methyl hydrogen maleate, ethyl hydrogen maleate, ethyl acrylate, methyl methacrylate, ethyl methacrylate, methyl acrylate, isobutyl acrylate, methyl fumarate, vinyl acetate, vinyl propionate, vinyl benzoate, vinyl chloride, vinylidene chloride, acrylamide, acrylonitrile, methacrylonitrile, fumaronitrile, or combinations or derivatives thereof.

In some aspect, the copolymer is obtained in the form of an aqueous emulsion.

In some aspects, the copolymer includes ethylene and acrylic acid or methacrylic acid.

The solids content of the copolymer emulsion is preferably about 10 wt % to 60 wt %, preferably about 30 wt % to 50 wt %.

The viscosity of the copolymer emulsion is about 5 cP to 5000 cP, preferably about 100 cP to 2000 cP.

Commercially available copolymers of one or more α-olefins and one or more acid-based monomers include Cohesa X3060, Aquaseal™ 1307, Aquaseal™ 2077 and Aquaseal™ 2045, available from Paramelt.

Overprint Varnishes

According to another aspect of the present invention, the coating of the invention is an overprint varnish (OPV) which is applied over one or both of the primer composition and inks. The OPV provides one or more of increased chemical resistance, rub resistance, scratch resistance, and heat resistance. The OPV also controls the static and dynamic coefficients of friction (CoF) of the substrate that is in contact with other components (such as rollers on the press, substrate in contact with other substrate, and between label and article (e.g., container) for downstream converting and processing). CoF is a value relating to the force of friction exerted between two objects. Higher CoF means greater force is required to overcome the force of friction in order to move one or both of the objects, A high CoF between the substrate and another object could affect processing speed and could make the substrate and/or coatings thereon more susceptible to damage. On the other hand, if CoF is too low, then the objects could slip over each other, which could also make processing more difficult. The OPVs described herein can both raise and lower the CoF in order to overcome or avoid these problems.

Preferably, the compositions of the overprint varnish described herein comprise, on a solid weight basis, 10 to 90% of one or more (meth)acrylic homopolymers or (meth)acrylic copolymers and 10-90% of one or more gum rosins.

Preferably, the compositions of the overprint varnish described herein comprise, on a solid weight basis, 25 to 75% of one or more (meth)acrylic homopolymer or (meth) acrylic copolymer of 25-75% of one or more gum rosins.

As used herein, the terms "(meth)acrylate," "(meth) acrylic", "acrylate" "(meth)acrylic" and "acrylic" include both acrylic acid, methacrylic acid, acrylate compounds, (meth)acrylate compounds, unless specified otherwise. In other words, the terms are used interchangeably and carry the same meaning unless otherwise specified.

The (meth)acrylic homopolymer or (meth)acrylic copolymer may be the polymerization product of one or more, alkyl acrylate monomers, aryl acrylate monomers, alkaryl (meth)acrylate monomers, acrylic acid and the ester thereof, methacrylic acid and the ester thereof, containing alcohols that include at least one heteroatom in addition to the oxygen atom in the alcohol group, and alcohols containing an aliphatic ring or an aromatic ring. Combinations thereof are possible.

Exemplary acrylate monomers include, but are not limited to, methyl methacrylate, methyl acrylate, n-butyl acrylate, ethyl acrylate, 2-ethylhexyl acrylate, 2-ethoxyethyl acrylate, 2-butoxyethyl (meth)acrylate, dimethylaminoethyl (meth) acrylate, diethylaminoethyl (meth)acrylate, cyclohexyl (meth)acrylate, phenylethyl (meth)acrylate, phenylpropyl (meth)acrylate, acrylates of heterocyclic alcohols, e,g., furfuryl (meth)acrylate, and combinations thereof. In addition, the (meth)acrylic copolymer can include pure (meth)acrylic copolymer, ethylene (meth)acrylic copolymer, and styrene (meth)acrylic copolymer which comprise at least one of (meth)acrylic acid, itaconic acid, methyl (meth)acrylate, ethyl (meth)acrylate, n-butyl (meth)acrylate, isobutyl (meth) acrylate, tert-butyl (meth)acrylate, 2-ethylhexyl (meth)acrylate, (meth)acrylamide, (meth)acrylonitrile, and hydroxyethyl (meth)acrylate, etc.

In addition to the above, (meth)acrylic homopolymer or (meth)acrylic copolymer may also include polymerized groups deriving from other monomers such as those having olefinic double bond(s) capable of undergoing free radical polymerization, including but not limited to vinyl ethers (such as methyl vinyl ether, ethyl vinyl ether, butyl vinyl ether and vinyl ethers with longer carbon-chain lengths), vinyl esters (such as vinyl acetate and esters based on versatic acid), vinylaromatic compounds, nitriles, vinyl halides, hydrocarbons, and the like, such as vinyl laurate, vinyl stearate, vinyl propionate, vinyl acetate, vinyltoluene, α- and p-styrene, α-butylstyrene, 4-n-butylstyrene, 4-n-decylstyrene, styrene, chlorine-, fluorine- or bromine-substituted ethylenically unsaturated compounds, vinyl chloride, vinylidene chloride, 1,3-alkenes (such as butadiene, isoprene and chloroprene), and combinations thereof.

In addition to the above, the (meth)acrylic homopolymer or (meth)acrylic copolymer may also include polymerized groups deriving from one or more styrenic monomers. Suitable styrenic monomers for use include those having a substituted or unsubstituted phenyl group attached to an ethylene moiety. Styrenic monomers include, but are not limited, to styrene, α-methylstyrene, p-methylstyrene, t-butylstyrene, o-chlorostyrene, vinyl pyridine, and combinations thereof.

In addition to the above, the (meth)acrylic homopolymer or (meth)acrylic copolymer may also include polymerized groups deriving from one or more carboxylic acid functional group in the compound. Illustrative carboxylic acid functional monomers include, but are not limited to acrylic acid, methacrylic acid, itaconic acid, crotonic acid, maleic acid and fumaric acid. The term "carboxylic acid functional monomers" also includes the anhydride derivatives of the carboxylic acid functional monomers listed above. The carboxylic acid functional monomers may include one, two, three, four, or more, different carboxylic acid functional monomers.

In one aspect, the (meth)acrylic homopolymer or (meth) acrylic copolymer is present in the OPV as an aqueous dispersion. The solids content of the dispersion may be about 30 wt % to about 70 wt %, preferably about 35 wt % to about 65 wt %, and more preferably about 40 wt % to about 60 wt %, based on the weight of the (meth)acrylic copolymer dispersion.

In one aspect, the viscosity of the (meth)acrylic homopolymer or (meth)acrylic copolymer dispersion is about 10 cP to about 3,000 cP, preferably about 100 cP to about 2,500 cP, and more preferably about 200 cP to about 2,000 cP.

Gum Rosins

Gum rosins are comprised of organic acids, such as abietic type, pimaric type, and derivatives thereof. Gum rosin acids include abietic acid, neoabietic acid, palustric acid, levopimaric acid, dihydroabietic acid, pimaric acid, isopimaric acid, and sandaracopimaric. Gum rosins are often used in a modified form. Gum rosins can be esterified with, for example pentaerythritol, to produce polyester resins. Gum rosins can be reacted with acids and/or anhydrides, such as maleic anhydride or fumaric acid, to produce modified renewable resins. Any gum rosin dispersion or solid may be used in the coatings described herein.

Renewable gum rosin materials that can be used in the present OPVs are maleic, fumaric, and polyester resins derived from gum rosin feedstocks. Other bio-renewable gum rosins may also be used. Suitable bio-renewable resins include, but are not limited to, Erkamar 3275, Erkamar 3300, Erkamar 3266, and Erkamar 3270, from Rokra-Kraemer (all maleic resins); Reactol 5145A (polyester resin), HydroRez 3886 (fumaric resin), HydroRez 6200 (fumaric resin), and HydroRez 6500 (fumaric resin), from Lawter; combinations thereof, and the like. AltaRez 1042, 1043 and 1053 from Ingevity may also be used. Further, a styrene acrylic emulsion, such as include Joncryl ECO 2124, Joncryl ECO 2189 from BASF and Induprint 1831 from Indulor may be used.

In one aspect, the gum rosins have a solids content of about 20 wt % to about 100 wt %, preferably about 30 wt % to about 100 wt %, and more preferably about 35 wt % to about 100 wt %, based on the weight of the rosin copolymer dispersion.

In one aspect, the acid number of gum rosin is in the range of about 10 to about 250, preferably in the range of about 30 to about 200, and more preferably in the range of about 50 to about 150.

In one aspect, the melt temperature (Tm) of gum rosin is about 10° C. to about 250° C., preferably about 30° C. to about 200° C., and more preferably about 50° C. to about 150° C.

Crosslinking Agents

In one aspect, a crosslinking agent may be included in the primer composition, OPVs, and seaming solutions described herein. Exemplary crosslinking agents include melamine formaldehyde, polyethylene imine (aziridine), ammonium zinc carbonate, ammonium zirconium carbonate, sodium hydroxide, potassium hydroxide and mixtures thereof. The inclusion of the crosslinking agent may further improve or enhance the resistance properties of the compositions. The amount of crosslinking agent included in the compositions may be about 0.05 wt % to 15 wt %.

Waxes

In one aspect, a wax may be included in the primer composition, OPVs, and seaming solutions described herein. The wax may be in a powder form or in an aqueous dispersion thereof. Suitable waxes that can be used in the compositions include, but are not limited to, polyethylene (PE), polypropylene (PP), ethylene-acrylic acid (EAA), ethylene-vinyl alcohol (EVA), paraffin, amide, carnauba waxes, and mixtures thereof. Waxes may be included in the compositions in amounts of 0.05 wt % to 15 wt %.

Additives

In one aspect, additives may be included in the primer composition, OPVs, and seaming solutions described herein. Additives include, for example, defoamers, wetting agents, leveling agents, colloidal stabilizers, rheology modifiers, biocides, pesticides, surfactants, adhesion promoters, silicones, light stabilizers, de-gassing additives, waxes, ammonia, flow promoters, defoamers, antioxidants, stabilizers, dispersants, plasticizers, rheological additives, and others, and combinations thereof. In addition, other additives can be included in the compositions in order to enhance the usefulness of the coating compositions or the coatings produced by curing the coating compositions. For example, plasticizers, antimicrobials, coloring agents, optical brighteners, ultraviolet absorbers, antioxidant, and the like can be incorporated into the coating compositions of the present invention, if desired. Additives may be included in the compositions in amounts of 0.05 wt % to 15 wt %.

Fillers

In one aspect, additives may be included in the primer composition, OPVs, and seaming solutions described herein. Suitable fillers include, for example, talc, clay, alumina, silica, titanium dioxide, sodium hexametaphosphate, calcium carbonate and mixtures thereof. Other materials may be used. Fillers may be included in the compositions in amounts of 0.05 wt % to 15 wt %.

Colorants

In one aspect, colorants may be included in the primer composition, OPVs, and seaming solutions described herein. Suitable colorants include, but are not limited to, organic or inorganic pigments and dyes known to the person of ordinary skill in the art. Suitable dyes include, for example, fluorescent dyes, azo dyes, anthraquinone dyes, xanthene dyes, azine dyes, and combinations thereof. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7.

Inorganic pigments that may be included in the compositions are, for example: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the desired colors.

In one aspect, the described compositions are clear, that is, they do not contain colorants.

In one aspect, the coatings are pigmented. For example, the OPV may contain $TiO_2$ pigments, making the OPV white and opaque.

In one aspect, the coating described herein may be energy curable. For example, the coatings may be cured by exposure to ultraviolet (UV) energy, or energy emitted by an electron beam (EB) source.

One or more (or all) of the coatings described herein can be printed digitally, such as on the HP Indigo press. One or more or all of the coatings may be printed in-line digitally. Alternatively, the coating of the present invention may be applied to substrates off-line by conventional coating techniques. For example, the coatings may be applied to substrates by printing techniques such as flexography ("flexo"), gravure, lithography, offset, and screen printing; and can be applied by other methods such as, for example, roller coating, rod coating, roll metering, blade coating, comma coating, spray coating, screen coating, and rotary screen coating. The skilled artisan is capable of adjusting parameters such as coating viscosity and coating solids content, for each such application technique. Substrates may be paper, film or nonwoven, and in one aspect, the application is by a printing employing a flexographic or gravure printing press.

Coating weight depends on the deposition technique used and the end-user application. As a general matter, coating weight may be 0.5 $g/m^2$ to 10 $g/m^2$ preferably 1 $g/m^2$ and 6 $g/m^2$, and even more preferably 1.5 $g/m^2$ and 4 $g/m^2$. These coating weights are dry coating weights.

In one aspect, described herein is a shrink sleeve label substrate coated with the coating of the invention. Shrink sleeve label substrates are shrinkable polymeric films that can be shrunk to a smaller size, such as shrunk upon exposure to heat. Shrink sleeve labels may formed into endless loops by forming a seam out of the contacting edges of the shrink sleeve label substrate. The seam is formed with a seaming solution, which is one of the aspects described in the present disclosure. The seam, i.e., contacting edges, may be formed out of an overlap of the edges, joined together by the seaming solution placed on one or both of the edges. The overlap may be 7 mm from the substrate edge, or less (e.g., 6 mm, 5 mm 4 mm, etc.). The endless loops formed from the seamed shrink sleeve label substrates may be fitted over articles, for example plastic containers and bottles, and other articles of commerce. Once placed over the articles, the endless loops are exposed to heat, such as heat provided in a heat tunnel. The exposure to heat causes the shrink sleeve label to shrink, bringing the endless loop into conformity with the shape of the article, which may provide a tight and snug fit of the shrunken loop to the shape of the article.

In one aspect, the entire shrink sleeve label film substrate is coated with one or more the coatings, that is, the primer composition and the OPV. While the seaming solution may be so coated, ordinarily it is applied only in the seaming area, e.g., within 7 mm or one or more of the edges where the seam is formed.

Seaming Solutions

Preferably, the seaming solution of the invention comprises about 0 wt % to 50 wt % of a polyester resin or a polyester resin blend and 50 wt % to 100 wt % of one or more solvents, wherein if polyester is present, the Tg of the polyester resin or polyester resin blend is about −10° C. to about 50° C., and one of the solvents is a seam-welding solvent. In one aspect, the seaming solution has a viscosity of 1.0 cP to 50 cP as determined on a Brookfield DV-2T viscometer with spindle SC4-18 (18) at 30 rpm, at 25° C. or approximately thereto. The Tg of a polyester blend is the Tg value of the combined polyester resins.

More preferably, the seaming solution of the invention comprises about 0 wt % to 25 wt % weight of polyester resin or polyester resin blend and 80 wt % to 100 wt % of one or more solvents, wherein if polyesters are present, the Tg of the polyester resin or polyester resin blend is about −10° C. to about 50° C., and one of the solvents is a seam-welding solvent. In one aspect, the seaming solution has a viscosity of 1 cP to 50 cP as determined on a Brookfield DV-2T viscometer with spindle SC4-18 (18) at 30 rpm, at 25° C. or approximately thereto. The Tg of a polyester blend is the Tg value of the combined polyester resins.

Any well-known seam welding solvent may be used in the seaming solutions. Exemplary seaming solvents include tetrahydrofuran (THF), 1,3-dioxolane, dioxane, n-hexane, cyclohexane, methylcyclohexane, methyl ethyl ketone (MEK), acetone, methyl isobutyl ketone (MIBK), methyl acetate, methanol, isopropyl alcohol, and combinations thereof. THF, MEK and 1,3-dixolane are preferable.

Exemplary commercially available polyester resins that may be included in the seaming solutions include Dynapol® L206, L208, 490 from Evonik and Vylon® 200, 390 from Toyobo. Other polyester resins are listed in Table 3 below.

In one aspect, the seaming solutions may also contain a hydrogenated rosin, for example, hydrogenated rosin selected from partially hydrogenated rosin, fully hydrogenated rosin, and combinations thereof. In another aspect, the seaming solution is free of hydrogenated rosin.

The hydrogenated rosin may be for example, a hydrogenated rosin selected from partially hydrogenated rosin, fully hydrogenated rosin, and combinations thereof, the hydrogenated rosin having one or both of: a Tg or a softening point lower than the first resin but higher than the second resin; and an acid value of 80 mg KOH/g to 200 mg KOH/g.

The hydrogenated rosin may be for example, a hydrogenated rosin selected from partially hydrogenated rosin, fully hydrogenated rosin, and combinations thereof, the hydrogenated rosin having one or both of: a Tg or a softening point lower than the first and second resins; and an acid value of 80 mg KOH/g to 200 mg KOH/g.

A hydrogenated rosin material can provide green bond strength to the composition, can soften in a hot caustic bath, and can be hydrolysable but not solutionable in same. Such materials may be obtained from Eastman Chemical Company, Kingsport TN, under the FORAL® trade name, at least some of which are thermosets. Foral AX-E, a fully hydrogenated rosin, may be included.

The seaming solution compositions may optionally contain a colorant, such as a dye, a pigment, a taggant, or a fluorophore, to provide means to visualize the deposition or notify those who encounter the labeled article that a seaming solution is present on the label.

EXAMPLES

The following examples illustrate specific aspects of the present invention and are not intended to limit the scope thereof in any respect and should not be so construed. These examples are illustrative and are not to be read as limiting the scope of the invention as it is defined by the appended claims.

TABLE 1

Compositions and Properties of Inventive Example 1 Primer

| Example 1 Material | Description | Wt % |
|---|---|---|
| Alberdingk U4000 VP | Polyurethane dispersion | 79.16 |
| Cohesa X3060 | Ethylene-acrylic acid (EAA) emulsion | 20 |
| Foamex 1488 | Antifoam | 0.1 |
| WB-0268 | Biocide | 0.24 |
| Surfynol 440 | Wetting agent | 0.5 |
| Total | | 100 |
| Solids % | | 32.8 |
| Viscosity, DIN 4, sec | | 13 |
| Surface Energy, mJ/m$^2$ | | 35.4 |
| Surface Tension, mN/m | | 41.1 |
| COF, A-A, Static, μ | | 0.55 |
| COF, A-B, Static, μ | | 0.496 |
| Haze % | | 6.58 |
| Adhesion, Tape 610 | | Pass |

Primers were prepared by mixing the above components together in a Dispermat mixer until blended.

Example 1 was printed onto PET-G film with a 2.07 BCM (1000 line/inch) anilox roller on a Soloflex flexographic press at a speed of 75 m/min. The drying temperature was between 50° C. and 60° C. The Example 1 primer was applied to the entire surface of the film. That is, without lane priming.

TABLE 2

Compositions and Properties of Examples 2-4 OPV's.
Comparative Example 4 does not contain gum rosin.

| Materials of Examples | Description | Ex. 2 Wt % | Ex. 3 Wt % | Comp Ex. 4 Wt % |
|---|---|---|---|---|
| Reactol 5145 A | Gum rosin ester | 7 | 10 | 0 |
| HydroRez 3886 A | Gum rosin ester | 8 | 10 | 0 |
| Joncryl ECO-2177 | (Meth)acrylic copolymer dispersion | 19.2 | 9.2 | 74.75 |
| Aquacer 3RC 1452 | Wax | 1 | 1 | 1 |
| Hydrocer 357 | Wax | 0.2 | 0.2 | 0.2 |
| Foam blast 1051 | Defoamer | 0.2 | 0.2 | 0.2 |
| Hydricure ZP | Crosslinker | 2 | 2 | 2 |
| Pen-Cote DUHV | Thickener | 1 | 1 | 1 |
| Geropon 99 | Wetting agent | 1 | 1 | 1 |
| Ammonium Hydroxide | | 4 | 4 | 0 |
| Water | | 56.25 | 61.25 | 19.7 |
| Proxel GXL | Biocide | 0.05 | 0.05 | 0.05 |
| Blancophor 150 LQ01 | Optical Brightener | 0.1 | 0.1 | 0.1 |
| Total | | 100 | 100 | 100 |
| Solids % | | 26.7 | 27.1 | 37.3 |
| Ester %, based on solid weight | | 56.1 | 73.7 | 0 |
| (Meth)acrylate %, based on solid weight | | 33.1 | 15.6 | 92.2 |
| Additives %, based on solid weight | | 9.2 | 9 | 6.6 |

TABLE 2-continued

Compositions and Properties of Examples 2-4 OPV's.
Comparative Example 4 does not contain gum rosin.

| Materials of Examples | Description | Ex. 2 Wt % | Ex. 3 Wt % | Comp Ex. 4 Wt % |
|---|---|---|---|---|
| Wax %, based on solid weight | | 1.6 | 1.7 | 1.2 |
| PH | | 9.1 | 8.6 | 8.8 |
| Viscosity, cP | | 76 | 1900 | 58 |
| Foaming volume % (aeration test) | | <25% | <25% | <25% |
| Adhesion, Tape 610 | | pass | pass | fail |
| Dry CoF, Static, coating to blank | | 0.29 (pass) | 0.29 (pass) | 0.41 (fail) |
| Dry CoF, Kinetic, coating to blank | | 0.28 (pass) | 0.28 (pass) | 0.36 (fail) |
| Wet CoF, Static, coating to blank | | 0.89 (pass) | 0.54 (pass) | 0.74 (pass) |
| Wet CoF, Kinetic, coating to blank | | 1.03 (pass) | 1.06 (pass) | 1.16 (fail) |
| Rub resistance, 4 lbs, face to face, 1500 strokes | | Pass | Pass | Fail |

Example 2: In a 6 oz jar, 0.2 g of Foamblast 1051, 7 g of Reactol 5145A and 8 g of Hydro-Rez 3886 were added into 56.25 g of water and 4 g of ammonium hydroxide. The mixture was mixed until all the solid completely dissolved, then 19.2 g of Joncryl ECO-2177 was added into the mixture while mixing. After mixing for further 15 minutes, 1 g of Aquacer 3RC 1452, 0.2 g of Hydrocer 357, 1 g of Pen-cote DUHV, 1 g of Geropon 99, 0.05 g Proxel GXL, 0.1 g of Blancophor 150 LQ01, and 2 g of Hydricure ZP were added, respectively, followed by 30 minutes of mixing. The final product was left on benchtop at room temperature for several hours before making prints.

Example 3: In a 6 oz jar, 0.2 g of Foamblast 1051, 10 g of Reactol 5145A and 10 g of Hydro-Rez 3886 were added into 61.25 g of water and 4 g of ammonium hydroxide. The mixture was mixed until all the solid completely dissolved, then 9.2 g of Joncryl ECO-2177 was added into the mixture while mixing. After mixing for further 15 minutes, 1 g of Aquacer 3RC 1452, 0.2 g of Hydrocer 357, 1 g of Pen-cote DUHV,1 g of Geropon 99, 0.05 g Proxel GXL, 0.1 g of Blancophor 150 LQ01, and 2 g of Hydricure ZP were added, respectively, followed by 30 minutes of mixing. The final product was left on benchtop at room temperature for several hours before making prints.

Comparative Example 4: In a 6 oz jar, 0.2 g of Foamblast 1051, and 74.75 g of Joncryl ECO-2177 were added into 19.7 g of water. After mixing for 15 minutes, 1 g of Aquacer 3RC 1452, 0.2 g of Hydrocer 357, 1 g of Pen-cote DUHV, 1 g of Geropon 99, 0.05 g Proxel GXL, 0.1 g of Blancophor 150 LQ01, and 2 g of Hydricure ZP were added into the mixture, respectively, followed by 30 minutes of mixing. The final product was left on benchtop at room temperature for several hours before making prints.

The OPVs of Examples 2-4 were applied to PET-G film printed with Example 1 primer and HP Indigo inks, using a K-Lox 4 BCM anilox roller. After application, the coatings were dried at 25° C. for 2 hours prior to testing.

As shown in Table 2, Inventive Examples 2 and 3 contain 56.1 wt % and 73.7 wt % of gum rosin esters respectively, based on solid weight; and Comparative Example 4 contains 0 wt % gum rosin esters based on solid weight. Inventive Examples 2 and 3 showed better tape adhesion, better rub resistance and lower dry static coefficient of friction than Comparative Example 4. This result indicates that gum rosin esters can form stronger bonding with PET-G shrink sleeve and improve the OPV's mechanical properties.

TABLE 3

Compositions and Properties of Examples 5-8 Seaming Solutions

| | Description | Inv. Ex. 5 (Wt %) | Inv. Ex. 6 (Wt %) | ADH A100 (Wt %) | Comp. Ex. 7 (Wt %) | Comp. Ex. 8 (Wt %) |
|---|---|---|---|---|---|---|
| Vitel 3300B | Polyester | 0 | 14.97 | | 12 | 0 |
| Vitel 2200B | Polyester | 0 | 0 | | 0 | 14.97 |
| Vylon GK-880 | Polyester | 0 | 0 | | 12 | 0 |
| Dynapol L411 | Polyester | 0 | 0 | | 0 | 0 |
| Foral AX-E | Hydrogenated Rosin | 0 | 0 | | 0 | 0 |
| Glycerin | Plasticizer/Solvent | 0 | 0 | | 0 | 0 |
| Methyl Acetate | Solvent | 0 | 42.5 | | 0 | 0 |
| 1,3-Dioxolane | Solvent | 99.97 | 42.5 | | 75.97 | 85 |
| THF | Solvent | 0 | 0 | | 0 | 0 |
| Optiblanc PL | Optical Brightener | 0.03 | 0.03 | | 0.03 | 0.03 |
| Total | | 100 | 100 | | 100 | 100 |
| Solids % | | ~0 | 15 | | 24 | 15 |
| Viscosity (cP) | | 1 | 7 | | 74 | 21 |
| Tg (° C.) | | N/A | 16 | | 47 | 69 |

ADH 100 is a commercially available seaming solution available from Sun Chemical Corporation, Parsippany NJ.

Seaming solutions were prepared by blending the components together and mixing until all components dissolved, and the solution became clear.

Examples 5-8 were used to form a continuous, adhesively bonded seam at the overlapped longitudinal edge portions of PET-G shrink sleeves printed with primer (Example 1) or OPV.

TABLE 4

Physical properties of Components in Examples 1-8

| | Solids (%) | Viscosity (cP) | Tm (° C.) | Tg (° C.) | Acid Number (mg KOH/g) | Molecular Weight (Da) | Tensile Strength (psi) | Elongation (%) |
|---|---|---|---|---|---|---|---|---|
| Alberdingk U4000 VP | 28 | 20-200 | N/A | N/A | N/A | N/A | N/A | N/A |
| Cohesa X3060 | 45 | 500 | N/A | N/A | N/A | N/A | N/A | N/A |
| Reactol 5145 A | 100 | N/A | 127 | N/A | 125 | N/A | N/A | N/A |
| Hydro-Rez 3886 A | 100 | N/A | 130 | N/A | 130 | N/A | N/A | N/A |
| Joncryl ECO 2177 | 46 | 300-800 | N/A | 21 | 55 | N/A | N/A | N/A |
| Vitel 3300B | 100 | N/A | N/A | 16 | 0-2 | 63,000 | 500 | 800 |
| Vitel 2200B | 100 | N/A | N/A | 69 | 1-3 | 47,500 | 9,600 | 7 |
| Vylon GK-880 | 100 | N/A | N/A | 84 | 0-2 | 18,000 | N/A | N/A |
| Dynapol L411 | 100 | N/A | N/A | 47 | 2 | 16,000 | N/A | N/A |
| Foral AX-E | 100 | N/A | N/A | 37 | 165 | N/A | N/A | N/A |

TABLE 5

Performance Results of the Combination of Examples 1 & 5; and Example 1 & ADHA100

| | Inv. 1/5 | Inv. 1/ADHA100 |
|---|---|---|
| 24 hrs T-peel strength (gf) | 38 | 21 |
| 24 hrs S-pull strength (gf/in) | 12,300 | 3,187 |
| Shrink application | Pass | Pass |
| De-seaming time at 75° C. (min) | | 6:10 |

As shown in Table 5, Example 5 and ADHA100 were used as seaming solutions to adhere the PET-G substrate printed with Example 1 primer (with primer coverage to the edge of the substrate (i.e., without lane priming)). In both cases, the T-peel strength was greater than 20 gf and S-pull strength larger than 3,000 gf/inch, which ensured the success of shrink application. Particularly, the shrink sleeve label made by the Inventive Primer Example 1 and ADHA100 can be removed within 10 min when being immersed in a hot caustic bath containing 1 wt % NaOH at 75° C.

TABLE 6

Performance Results of the Combination of Examples 2, 3, 4 and Example 6

| | Inv. 2/6 | Inv. 3/6 | Comp. 4/6 |
|---|---|---|---|
| 2 hrs T-peel strength (gf) | 22 | 29 | 28 |
| 2 hrs S-pull strength (gf/inch) | 4,663 | 4,092 | 2,912 |
| 24 hrs T-peel strength (gf) | 22 | 27 | 14 |
| 24 hrs S-pull strength (gf/inch) | 6,535 | 4,997 | 5,677 |
| Shrink Application | Pass | Pass | Fail |

In Table 6, Example 6 was used as seaming solution to adhere the substrates printed with the OPV Examples 2 & 3. The comparative Example 4 gave weak bond strength (2 hrs S-pull strength <3,000 gf/in and 24 hr. T-peel strength <20 gf), and the resulting sample failed in the shrink application.

Table 6 demonstrates that the OPVs described herein improve bond strength. The described OPVs work with the seaming solutions described herein to ensure the sufficient bond strength for shrink sleeve labels.

TABLE 7

Performance results of the Combination of Example 2 and Comparative Example 7 and the Combination of Example 2 and Comparative Example 8.

| | Comp. 2/7 | Comp. 2/8 |
|---|---|---|
| 2 hrs T-peel strength (gf) | 14 | 7 |
| 2 hrs S-pull strength (gf/inch) | 4,608 | 10,627 |
| 24 hrs T-peel strength (gf) | 7 | N/A |
| 24 hrs S-pull strength (gf/inch) | 5,907 | N/A |
| Shrink Application | Fail | Fail |

Table 7 shows the results of the Comparative Examples 7 and 8 seaming solution when used on an inventive OPV Example 2. The T-peel bond strength of both samples was less than 20 gf, and both of them failed in the shrink application test.

Inventive Primer Composition Compared to Formulation 2 of U.S. Pat. No. 7,985,483.

The primer composition of Example 1 was compared to a comparative primer composition according to formulation 2 of U.S. Pat. No. 7,985,483, which describes different component amounts (Comparative Example 9). Formulations are below in Table 8.

TABLE 8

| | Comparative Example 9 -- Formulation 2 of U.S Pat. No. 7,985,483 Wt % |
|---|---|
| Neorez R-600 | 10 |
| Michem PR 4990 | 90 |

Alberdink® U-4000 VP is an aliphatic polyurethane dispersion.

Neorez® R-600, from DSM, is an aliphatic polyurethane dispersion.

Cohesa X3060 is an ethylene-acrylic acid (EAA) emulsion.

Michem PR 4990 is a dispersion of an ethylene acrylic acid copolymer.

Adhesion of the primer compositions to OPP was determined. Also determined and the adhesion of HP Electroink to the OPP substrates primed with Example 1 and Comparative Example 9 is described in Table 9:

TABLE 9

Adhesion to Substrate and Ink Adhesion to Primer Coated Substrate

| Primer | Adhesion to OPP | Adhesion of HP Electroink to Primed Substrates |
|---|---|---|
| Comparative Example 9 | Yes | No |
| Example 1 | Yes | Yes |
| Example 1 | Yes | Yes |

ADHA100 seaming solution was used to form a continuous, adhesively bonded seam at the overlapped longitudinal edge portions of PET-G shrink sleeves printed with the Example 1 primer composition and Comp. Example 9 primer composition. The bond strength and shrink application results are shown in Table 10. The combination of Comp. Example 9 and ADHA100 gave 2 hrs T-peel strength less than 20 gf, and as a result, failed in the shrink application test.

TABLE 10

Performance Results of the Combination of Inv. Example 1 and AHA100; and the Combination of Comp. Example 9 and AHDA100

|  | Inv. 1/ADHA100 | Comp. 9/AHDA100 |
|---|---|---|
| 2 hrs T-peel strength (gf) | 27 | 14 |
| 2 hrs S-pull strength (gf/inch) | 3537 | 3112 |
| Shrink Application | Pass | Fail |

The solubility of the components in. Example 1 and Comp. Example 9, as well as the two examples themselves, was tested at 1% w/w in five different solvents including THF, DMF, MEK, Toluene and N-propanol. The five solvents possess different Hansen Solubility Parameters (HSPs) and cover almost the whole range of solubility defined by dispersion (Van de Waals), polarity and hydrogen bonding. As shown in Table 11, none of the materials are soluble in DMF, MEK or Toluene, and only NeoRez R-600 is soluble in N-propanol. However, both components in Comp. Example 9, as well as Comp. Example 9 itself, are soluble in THF. On the other hand, neither components in Inv. Example 1 is soluble in THF. Nor is Inv. Example 1 itself soluble.

TABLE 11

Solubility of Components in Inv. Example 1 and Comp. Example 9

| (1% w/w) | THF | DMF | MEK | Toluene | N-propanol |
|---|---|---|---|---|---|
| Alberdingk U4000 VP | Insoluble | Insoluble | Insoluble | Insoluble | Insoluble |
| Cohesa X3060 | Insoluble | Insoluble | Insoluble | Insoluble | Insoluble |
| NeoRez R-600 | Soluble | Insoluble | Insoluble | Insoluble | Soluble |
| MichemPrime 4990RE | Soluble | Insoluble | Insoluble | Insoluble | Insoluble |
| Inv. Example 1 | Insoluble | Insoluble | Insoluble | Insoluble | Insoluble |
| Comp. Example 9 | Soluble | Insoluble | Insoluble | Insoluble | Insoluble |

The print methods used in the examples of this disclosure does not exclude the compositions from being applied to other substrates by other methods. One of skill in the art would know how to adjust the formulations for viscosity, rheology, etc. be suitable for application by other methods (e.g. flexographic printing, gravure printing, blade coating, curtain coating, rod/bar coating).

Test Methods:

The solids content of the coating solutions was determined based on the weight difference of the compositions before and after evaporating water and other volatile liquid material. Evaporation was affected by heating one gram of the composition at 150° C. for 30 minutes.

Viscosity was measured by a Brookfield DV-2T viscometer with spindle SC4-18 (18) at 30 rpm, at 25° C. or approximately thereto.

Foam volume was determined in an aeration test in which 70 mL of coating composition was placed in a graduated cylinder and purged with air through tubing with a fritted glass tip at 100 mL/min for 5 minutes. The foam volume was recorded after stopping the purge. It is considered a pass if the percentage of foam volume over 70 mL is less than 25%.

Sutherland rub test (ASTM D5264). Printed samples were tested using a Sutherland Rub Tester. The test sample was attached to the base rubber pad of the rub tester. For the dry rub test, a dry felt pad was attached to the top (receptor) rubber pad of the rub tester. The rub tester was set to perform 100 strokes at 4 lb. weight. A stroke is one back and forth cycle. Results are reported as pass/fail. It is considered a pass if the percentage of ink removal is less than 10%.

Dry CoF was tested by TMI coefficient of friction tester, coating side to coating side. For dry CoF, static CoF between 0.20-0.33 and kinetic CoF between 0.18-0.28 is considered as a pass. Wet CoF was tested by TMI coefficient of friction tester, coating side to coating side, as well, except about 0.5 mL of water was added before testing. For wet CoF, static CoF below 1.68 and kinetic CoF below 1.13 is considered as a pass.

Adhesion was tested by 610 tape. Scotch 610 adhesive tape was applied to the printed and dried sample. The tape was manually pulled off, with a slow pull, followed by a fast pull, in a direction perpendicular to the surface of the print. The tape was pulled off immediately once it had been applied. It is considered a pass if there is no coating peeled off from the substrate.

Substrates were seamed with seaming solution so that the coated side faced the uncoated side (front side of the substrate). The seaming solution was applied using a Q-tip in combination with a manual seaming machine made by Ryback & Ryback (Monroe, NC, USA). The seam width was controlled to be 2-5 mm.

T-peel bond strength of the seam was measured along the direction of seaming using an Instron Model 3342 single column universal testing system, with a load of 50 N and crosshead speed of 300 mm/min, following ASTM Method D1876. The average peeling load at average value (integral) was determined from the autographic curve between the first and last peaks. The T-peel bond strength is the average peeling load in gram-force (or Newton) required to separate the adhered sleeves.

S-pull, the break strength of the seam in the shrink direction, (perpendicular to seaming) was measured by the same general method as "T-peel" bond strength. Break strength is the maximum peeling load in gram-force per inch (or Newton per inch) of the seam width, and is the load required to separate the adhered sleeves.

Shrink test was performed by immersing a blank bottle wrapped with a seamed shrink sleeve into a Ryback and Ryback S3 steam machine for 5-10 seconds, depending on the technique. A pass grade is awarded if the sleeve shrinks snuggly around the bottle and the seam stays intact coming out from the steam pot De-seaming was measured by immersing the sleeved bottle into a water bath containing a caustic solution at a temperature which is aimed at simulating the conditions of a full bottle (pre) wash process used in typical wet grinding PET recycling. Unless specified otherwise, the conditions of the bath were 1.0 wt % NaOH at 75° C. The de-seaming time was the time measured between the immersion of the bottle into the caustic until the sleeve label fully separated from the bottle.

The inventive aspects have been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. A method of preparing a substrate for the labeling of articles comprising the steps of:
   applying a primer composition to the substrate, without lane priming;
   the primer composition comprising 65 wt % to 85 wt % aqueous polyurethane dispersion and 5.0 wt % to 40 wt % aqueous dispersion of a copolymer of one or more α-olefins and one or more acid-based monomers.

2. The method of claim 1, wherein the primer composition is applied by a process selected from digital printing, inkjet, offset, flexographic, lithographic, gravure, screen printing, roll coating, spray coating, and die coating.

3. The method of claim 1, further comprising the step of applying a liquid toner ink composition over the primer composition.

4. The method of claim 3, wherein the primer composition facilitates adhesion of a liquid toner ink composition to a polymeric substrate.

5. The method of claim 1, wherein the substrate is selected from a heat shrinkable polymeric substrate, paper, art paper, coated paper, paperboard, polymeric films, and nonwovens.

6. The method of claim 5, wherein the substrate is a polymeric film or heat shrinkable polymeric substrate selected from polyethylene terephthalate, polyethylene terephthalate glycol, polybutylene terephthalate, polycarbonate, polyolefin, cyclic polyolefins, alpha-polyolefins, polyethylene, polypropylene, oriented polypropylene, polystyrene, oriented polystyrene, polyvinyl chloride, and nylon.

7. The method of claim 1, wherein the primer composition is applied on at least one edge of the polymeric substrate in a location that is within 7 mm of the at least one edge; or wherein the primer composition is applied on at least two edges of the polymeric substrate in locations that are within 7 mm of the at least two edges.

8. The method of claim 1, further comprising the step of applying a seaming solution that contacts and overlaps the primer composition; and/or further comprising applying an overprint varnish over the liquid toner ink.

* * * * *